Patented July 3, 1951

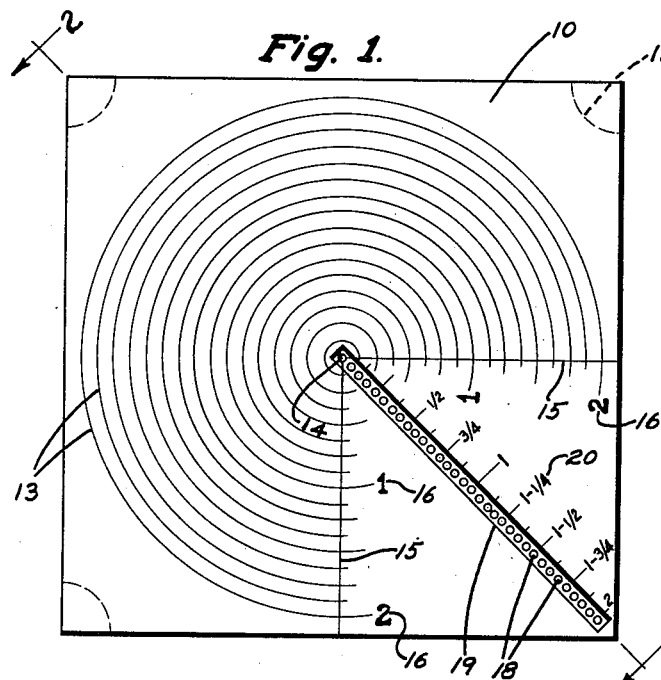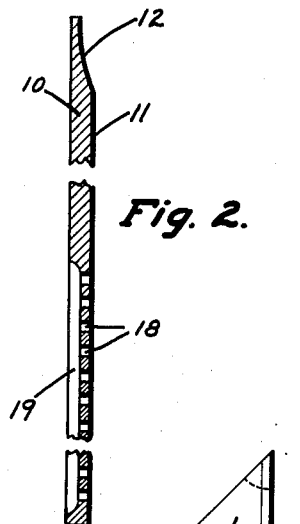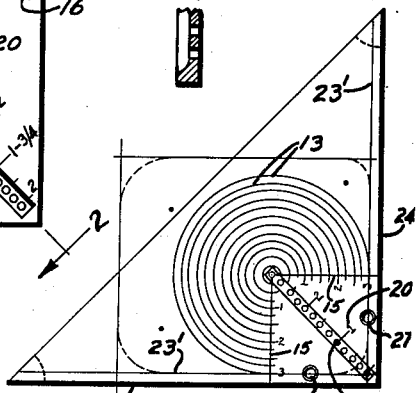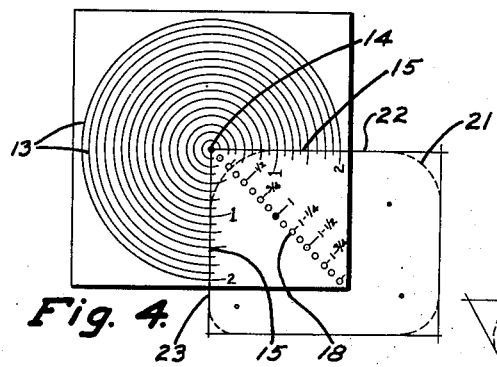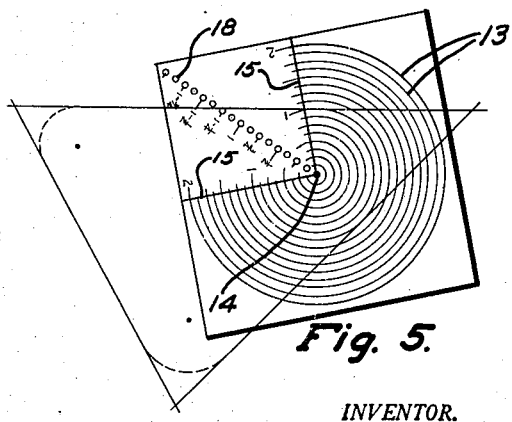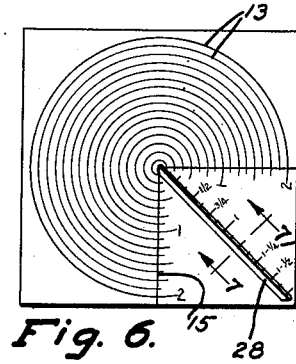

2,559,015

UNITED STATES PATENT OFFICE 2,559,015

ARC AND CENTER POINT LOCATING INSTRUMENT

Oscar Frederick Graff, Washington, D. C.

Application February 14, 1947, Serial No. 728,482

1 Claim. (Cl. 33—1)

My invention relates to a drafting instrument and is more particularly directed to a drafting instrument which makes it possible to quickly and accurately find and indicate center points for arcs or circles.

An object of the present invention is to provide an instrument which is exceedingly simple to use so that no particular skill is required and which may be cheaply manufactured since it involves no moving or adjustable parts that add to the expense of manufacture and which are apt to become detached and lost.

Another object of the invention is to provide a combination instrument by means of which the center point of arcs connecting diverging or converging lines as well as the center point of arcs connecting parallel lines, may be quickly and accurately located.

A further object resides in the fact that my invention may be combined with standard drafting instruments such as triangles, protractors, and the like without in any way interfering with the normal use of such instruments.

An additional object of the invention is to provide a center point locator which eliminates any necessity for mathematical calculations and in which visual means are provided by means of which the desired point may be instantaneously located.

While the invention is directed primarily to an instrument to enable the draftsman to locate a center point and then draw the arc of desired radius, it will of course be understood that the instrument is likewise adaptable for reading drawings where it is necessary to quickly and accurately locate the center point.

Other objects and advantages will be readily apparent from the following description taken in connection with the accompanying drawing, it being understood that only the preferred embodiments are illustrated and that changes in size, shape and the like may be resorted to so long as they fall within the scope of the appended claim.

Referring to the drawings:

Fig. 1 is a plan view of one form of my invention.

Fig. 2 is a sectional view taken on the line 2—2 of Fig. 1.

Fig. 3 is a view of a modified form of my invention applied to a conventional triangle.

Fig. 4 is a view illustrating one manner of using the form of invention shown in Fig. 1.

Fig. 5 illustrates another manner of using the same form of instrument.

Fig. 6 is a plan view of a modified form, and

Fig. 7 is a fragmentary sectional view taken on the line 7—7 of Fig. 6.

Referring now to the form of invention shown in Fig. 1, the instrument consists of a flat sheet or plate of transparent material 10 such as is commonly used in the manufacture of draftsman's triangles and the like.

While the sheet or plate 10 is shown in the form of a square in Fig. 1, it is obvious that it may partake of any desired configuration such as the triangle of Fig. 3.

The sheet 10 in Fig. 1 is provided on its lower face 11 at one or more of its corners with bevelled portions 12 so that when the sheet is lying flat upon the work it may be readily lifted by insertion of the fingernail thereunder.

Suitably inscribed on the sheet 10 are a plurality of spaced, concentric circular lines 13 having as their center an opening 14 of such size as to accommodate a pencil point which is inserted thereinto and by means of which the center point may be marked on the underlying work.

Sighting lines 15 intersect the circular lines 13 and diverge from the central opening 14 to the edge of the sheet 10 and these sighting lines are suitably marked with graduations 16 indicative of the radius of the circular lines 13.

In the forms shown, the lines 15 extend at right angles to each other to form an angle of 90° but it is evident that they may embrace any angle desired.

The construction so far described may be used after the fashion shown in Fig. 5 wherein is shown the manner of locating the center point of an arc having a radius of 1 inch and connecting the converging sides of the triangle. As shown, the sheet 10 is moved over the triangular figure until the circle having the desired radius is tangent to the converging lines. By then inserting a pencil point or other marking instrument through the opening 14 the exact location of the center point may be marked on the underlying work.

It will likewise be obvious that the circular lines 13 may be brought into tangency with parallel lines and the center point located in the same manner after which said parallel lines may be connected by an arc having as its center the point marked through the opening 14.

Sighting lines 15 extend as stated from the opening 14 to the edge of the sheet 10 at right angles to each other and from their point of divergence, i. e. the opening 14, to one edge of the sheet. There is provided a series of spaced aligned openings 18 through which a marking instrument may be inserted to mark the desired center point on the underlying work, it being noted that this series of openings lies midway between the sighting lines or bisects the angle between these lines.

The line of openings 18 are shown in Figs. 1 and 2 as lying in a groove 19 to thereby facilitate insertion of the marking instrument in the desired opening 18.

Along the edge of the groove 19 suitable graduations 20 may be placed to indicate the radii of the arcs that are to be drawn.

The manner of using the line of openings 18 to ascertain a center point is clearly shown in Fig. 4.

In this figure where it is desired to draw fillets or arcs 21 at the corners of a rectangular figure with the arcs of a 1 inch radius, the sheet 10 is moved over the figure until the sighting lines 15 overlie the converging lines 22 and 23. Then by inserting the pencil in the aperture graduated for 1 inch and marking the work at this point, the center point is instantly obtained so that the proper fillet may be drawn after removal of the sheet 10 from the work.

It will be obvious that since the sighting lines 15 are arranged to coincide with the edges of the rectangular figure, any of the openings 18 may be selected to give accurately the center point of a circle or arc of any desired radius.

From the foregoing it will be seen that the sighting lines 15 serve a dual function. First they act as the scale of radii for the circular lines 13 when these lines are used to determine the center point and secondly these same lines aid in locating the line of openings 18 so that any one of them may be used to mark the center point of an arc that connects the converging edges of the figure.

The present instrument, as can be readily seen, affords two different means of accurately and quickly locating center points either for drawing arcs of a given radius or for reading drawings that have already been prepared to ascertain the center points of arcs, fillets or the like but in both instances use is made of the scale and sighting lines 15.

Since the sight lines of Fig. 1 are at right angles to each other it is obvious that these lines cannot be used with figures other than those containing angles of 90°. For use on such figures the concentric circular lines 13 are used as in Fig. 5. Therefore the present invention combines the two types of point locators in a single instrumentality in an extremely simple manner thereby making it suitable for use under many varying conditions.

In Fig. 3 a variation of my invention is shown. In this figure sighting lines 23' are shown as parallel to the converging sides 24 and 25 of the triangle and extend at right angles to each other. Countersunk sight openings 26 and 27 are provided and these openings are centered with reference to the sight lines 23', thus making it possible to more readily position the sighting lines 23' so that they coincide with the converging side lines of the figure being drawn. In this form of instrument it will be seen that the scale markings 20 for the line of openings 18 are reversed with reference to similar markings in Fig. 1, and that the lines 15, serve as scales for the concentric circular lines 13 in the same manner as in Fig. 1 but do not have the dual function as hereinbefore described.

Figs. 6 and 7 show further modifications of my invention in that an elongated slot 28 is provided in lieu of the line of openings 18 in Figs. 1 to 5. Suitable graduations 29 are placed adjacent the slot and serve the same function as the graduations 20 in Fig. 1.

The slot 28 has one wall thereof bevelled as at 30 to facilitate insertion of the pencil in the slot, it being understood that the slot flares outwardly toward the top surface of the sheet 10.

The graduations, circular lines, and other markings on the sheet may be engraved or printed thereon or they may be produced photographically, but they should preferably, though not necessarily, be placed on the bottom surface of the sheet 10.

From the foregoing it will be clear that the present invention is extremely simple both as to use and manufacture, that it requires no special skill to use and rapidly and accurately ascertains the location of center points. Being unitary in structure there are no moving parts to adjust and no danger of losing any portion thereof, and since no mathematical calculations are necessary to locate the center points, it may be used by persons of very limited skill or knowledge.

I claim:

A drafting instrument comprising a flat, transparent body portion having sight lines inscribed thereon, said lines diverging from a common point and extending toward the edge of said body and being provided with radii scales therealong, a series of spaced concentric arcuate lines on one side of said sight lines having their ends terminating approximately at said sight lines, a groove in said body on the opposite side of said sight lines and extending from said common point of the sight lines to substantially the edge of the body and bisecting the angle between said sight lines, said groove having a series of spaced openings through the bottom thereof beginning at said common point and extending therealong and a scale along said groove whereby the sight lines serve the dual function of serving as a scale of radii for the arcuate lines when used to determine the radii of circles and also to locate the lineal series of openings when they are used to mark the center points of circles.

OSCAR FREDERICK GRAFF.

REFERENCES CITED

The following references are of record in the file of this patent:

UNITED STATES PATENTS

| Number | Name | Date |
|---|---|---|
| 727,680 | Otis | May 12, 1903 |
| 757,246 | Ablett | Apr. 12, 1904 |
| 1,154,673 | Van Ness | Sept. 28, 1915 |
| 1,461,335 | Vosler | July 10, 1923 |
| 1,598,690 | Petronio | Sept. 7, 1926 |
| 1,600,666 | Dugan | Sept. 21, 1926 |
| 1,619,427 | McCaffery | Mar. 1, 1927 |
| 2,014,190 | Simon | Sept. 10, 1935 |
| 2,016,489 | Escalante | Oct. 8, 1935 |
| 2,049,245 | Breitbarth | July 28, 1936 |
| 2,364,529 | Hill | Dec. 5, 1944 |
| 2,478,071 | Agrillo | Aug. 2, 1949 |
| 2,500,873 | Sager | Mar. 14, 1950 |

FOREIGN PATENTS

| Number | Country | Date |
|---|---|---|
| 2,575 | Great Britain | 1858 |
| 265,691 | Great Britain | 1927 |
| 327,000 | Germany | Oct. 6, 1920 |
| 328,689 | Great Britain | May 5, 1930 |